(12) United States Patent
Pomarede et al.

(10) Patent No.: US 11,880,063 B2
(45) Date of Patent: Jan. 23, 2024

(54) OPTICAL ELEMENT AND ASSOCIATED MANUFACTURING METHOD

(71) Applicants: CENTRE NATIONAL DE LA RECHERCHE SCIENTIFIQUE, Paris (FR); UNIVERSITE DE LIMOGES, Limoges (FR)

(72) Inventors: Damien Pomarede, Limoges (FR); Jean-Louis Auguste, Limoges (FR); Georges Humbert, Rilhac-Rancon (FR); Mathieu Allix, Olivet (FR); Cécile Genevois, Olivet (FR); Emmanuel Veron, Orleans (FR); Sébastien Chenu, Saint-Just-le-Martel (FR); Gaëlle Delaizir, Toulouse (FR)

(73) Assignees: CENTRE NATIONAL DE LA RECHERCHE SCIENTIFIQUE, Paris (FR); UNIVERSITE DE LIMOGES, Limoges (FR)

( * ) Notice: Subject to any disclaimer, the term of this patent is extended or adjusted under 35 U.S.C. 154(b) by 706 days.

(21) Appl. No.: 17/040,297

(22) PCT Filed: Mar. 22, 2019

(86) PCT No.: PCT/EP2019/057323
§ 371 (c)(1),
(2) Date: Sep. 22, 2020

(87) PCT Pub. No.: WO2019/180246
PCT Pub. Date: Sep. 26, 2019

(65) Prior Publication Data
US 2021/0088716 A1    Mar. 25, 2021

(30) Foreign Application Priority Data
Mar. 22, 2018  (FR) ...................... 1852502

(51) Int. Cl.
*G02B 6/02* (2006.01)
*C03C 13/00* (2006.01)
(Continued)

(52) U.S. Cl.
CPC ............ *G02B 6/0229* (2013.01); *C03C 3/078* (2013.01); *C03C 13/006* (2013.01);
(Continued)

(58) Field of Classification Search
CPC .......... C03C 3/06; C03C 3/076; C03C 3/078; C03C 10/0009; C03C 13/006; C03C 14/006; G02B 6/0229
See application file for complete search history.

(56) References Cited

U.S. PATENT DOCUMENTS

| 6,698,246 | B1 | 3/2004 | Beall et al. | |
| 9,593,039 | B2* | 3/2017 | Chenu | ..................... C03C 3/066 |
| 2003/0013593 | A1* | 1/2003 | Beall | ................... C03C 10/0018 501/10 |

FOREIGN PATENT DOCUMENTS

| CA | 2 276 006 A1 | 7/1998 |
| CN | 104163572 A | * 11/2014 |

(Continued)

OTHER PUBLICATIONS

X. L. Duan et al. Transparent cobalt doped MgO—Ga2O3—SiO2 nano-glass-ceramic composites. Applied Physics Letters 89, 183119, Nov. 3, 2006. (https://doi.org/10.1063/1.2378401) (Year: 2006).*
(Continued)

*Primary Examiner* — Michael Stahl
(74) *Attorney, Agent, or Firm* — BakerHostetler

(57) ABSTRACT

An optical element is provided. The optical element may comprise a material, the material being a matrix and a set of particles included in the matrix, the material having a molar fraction of $SiO_2$ higher than or equal to 65 percent, each (Continued)

Figure 1:
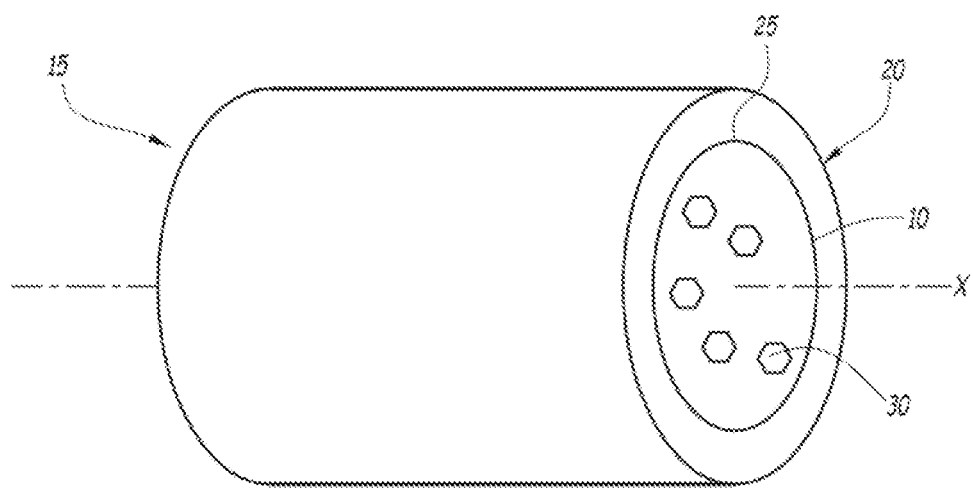

particle having a dimension smaller than or equal to 80 nanometers.

14 Claims, 4 Drawing Sheets

(51) Int. Cl.
    *C03C 3/078*     (2006.01)
    *C03C 13/04*     (2006.01)
    *H01S 3/16*     (2006.01)
    *H01S 3/17*     (2006.01)
    *C03C 14/00*     (2006.01)
    *H01S 3/067*     (2006.01)
    *C03C 10/00*     (2006.01)

(52) U.S. Cl.
    CPC .......... *C03C 13/046* (2013.01); *C03C 14/006* (2013.01); *H01S 3/169* (2013.01); *H01S 3/176* (2013.01); *C03C 10/0009* (2013.01); *H01S 3/0672* (2013.01)

(56) References Cited

FOREIGN PATENT DOCUMENTS

| CN | 105 102 389 A | | 11/2015 |
|---|---|---|---|
| CN | 106865990 A | * | 6/2017 |
| EP | 1 995 631 A1 | | 11/2008 |
| KR | 2013-0119048 A | | 10/2013 |

OTHER PUBLICATIONS

L. Yu et al. Photoluminescent properties of Dy3+ in MgO—Ga2O3—SiO2 nano-glass-ceramic prepared by sol-gel method. Physica B: Condensed Matter, 406:15-16, 3101-3103, Aug. 2011. (https://doi.org/10.1016/j.physb.2011.05.015) (Year: 2011).*

X. Duan et al. X-ray photoelectron spectroscopy studies of Co-doped ZnO—Ga2O3—SiO2 nano-glass-ceramic composites. Applied Surface Science, 257:9, 4291-4295, Feb. 15, 2011. (https://doi.org/10.1016/j.apsusc.2010.12.038) (Year: 2011).*

English translation of international preliminary report on patentability for PCT/EP2019/057323, dated 2020. (Year: 2020).*

First Chinese Office Action issued in Chinese Patent Application No. 201980029157.8 filed on Apr. 19, 2022, with English translation.

Chenu, S., et al., "Long-lasting luminescent $ZnGa_2O_4:Cr^{3+}$ transparent glass-ceramics", Journal of Materials Chemistry C, Oct. 2014, 10 pages.

Chenu, S., et al., "Tuneable Nanostructuring of Highly Transparent Zinc Gallogermanate Glasses and Glass-Ceramics", Advanced Optical Materials, Apr. 2014, pp. 364-372.

Fang, Z., et al., "$Ni^{2-}$ doped glass ceramic fiber fabricated by melt-in-tube method and successive heat treatment", Optics Express, Oct. 20, 2015, vol. 23, Issue 22, 6 pages.

Gao, Z., et al, "Selective doping of $Ni^{2+}$ in highly transparent glass-ceramics containing nano-spinels $ZnGa_2O_4$ and $Zn_{1+x}Ga_{2-2x}Ge_xO_4$ for broadband near-infrared fiber amplifiers", Scientific Reports, May 2017, vol. 7, Issue 1783, 8 pages.

Sigaev, V.N., et al., "Nickel-assisted growth and selective doping of spinel-like gallium oxide nanocrystals in germano-silicate glasses for infrared broadband light emission", Nanotechnology, Dec. 8, 2011, vol. 23, No. 1, 8 pages.

International Searching Authority, International Search Report (ISR) and Written Opinion for Application No. PCT/EP2019/057323, dated Jun. 5, 2019, 19 pages, European Patent Office, Netherlands.

Allix, M., et al., "Considerable Improvement of Long-Persistent Luminescence in Germanium and Tin Substituted $ZnGa_2O_4$", *Chemistry of Materials*, 2013, pp. 1600-1606, vol. 25, ACS Publications.

* cited by examiner

OPTICAL ELEMENT AND ASSOCIATED MANUFACTURING METHOD

CROSS-REFERENCE TO RELATED APPLICATIONS

The present application is a national phase entry PCT/EP2019/057323, filed on Mar. 22, 2019, which claims the benefit of priority of French Patent Application No. 1852502, filed on Mar. 22, 2018, the entire contents of which are hereby incorporated by reference in their entirety for all purposes.

FIELD

The present invention relates to an optical element. The present invention also relates to a method for manufacturing such an optical element.

BACKGROUND

Optical elements such as optical fibers are used in a large number of applications in particular related to the field of telecommunications. In particular, such optical elements are used to transmit optical radiation, but also in certain applications to emit, convert or amplify optical radiation. In these applications, the material making up the optical element is generally doped with ions such as rare earth ions. The wavelength of the obtained optical radiation then depends on the type of dopants used, and it may vary over a wide range of wavelengths.

These optical elements are generally made of a material transparent to the wavelength used, such as silica.

However, the range of wavelengths over which silica is transparent is relatively limited, especially in the infrared. In addition, rare earth ions are poorly soluble in silica, which limits the emission efficiency.

Optical elements made of glass-ceramic materials, more simply referred to as "glass-ceramics" in what follows, have been proposed as an alternative to optical elements made of silica. Glass-ceramics are materials comprising an amorphous matrix and a set of crystal grains contained in the matrix. These glass-ceramic optical elements make it possible in particular to consider using dopants which are not luminescent in silica.

However, the known glass-ceramics are difficult to implement, in particular in the form of optical fibers. Controlling the nanostructure of these glass-ceramics is in particular difficult to control. Consequently, ranges of wavelengths accessible by optical elements made of silica are difficult to access by optical elements made of these glass-ceramics.

The article by S. Chenu et al., "Tuneable Nanostructuring of Highly Transparent Zinc Gallogermanate Glasses and Glass-Ceramics" published in Advanced Optical Materials in 2014, discloses the first realizations of glass-ceramic materials, that is to say an amorphous material (matrix), in which crystal particles are distributed. These glass-ceramic materials are composed of nanoscale crystal particles of $ZnGa_2O_4$ and/or $Zn_{1+x}Ga_{2-2x}Ge_xO_4$ in a $GeO_2$ matrix. The possibility of producing these materials in an $SiO_2$ matrix is also mentioned. These glass-ceramics are obtained via the synthesis of glasses that are demixed (phase separation) at the nanoscale which are then crystallized (by a heat treatment), to give glass-ceramics which have the particularity of being transparent to light rays over the 0.4 µm 6 µm wavelength range.

The article by S. Chenu et al. "Long-lasting luminescent $ZnGa_2O_4:Cr^{3+}$ transparent glass-ceramics", published in Journal of Material Chemistry in 2014 discloses glass-ceramics composed of $ZnGa_2O_4$ crystal particles in a matrix of $SiO_2$. This study demonstrates the realization of glass-ceramics that are transparent (over the 0.4-4.5 µm range) and are composed of a matrix composed of 55% by molar fraction of $SiO_2$ and of crystal particles of $ZnGa_2O_4$. Additionally, this study shows that the $ZnGa_2O_4$ material allows a very long-lasting luminescence of the chromium ($Cr^{3+}$) metal ions. The metal ions are dopants inserted into the material. These results confirm the remarkable properties of the $ZnGa_2O_4$ material for intensifying the luminescence of dopants (such as metal ions here). Indeed, this work corroborates the experimental results published by M. Allix et al. in 2013 in the article "Considerable Improvement of Long-Persistent Luminescence in Germanium and Tin Substituted $ZnGa_2O_4$" (Chemistry of Materials) which relate to polycrystalline ceramics (non-transparent powder pellets) composed of Ge- and Sn-substituted $ZnGa_2O_4$. The $ZnGa_2O_4$ material has the advantage of having a crystal structure in which the gallium ions are only in octahedral sites, which promotes the luminescence of the metal ions (dopants) inserted into the material.

Nevertheless, as the $GeO_2$ or $SiO_2$ content of the glass-ceramics of the prior art does not exceed 60% by molar fraction, the spectral range accessible by optical elements made with these materials therefore remains limited.

The article by Z. Gao et al, "Selective doping of $Ni^{2+}$ in highly transparent glass-ceramics containing nano-spiels $ZnGa_2O_4$ and $Zn_{1+x}Ga_{2-2x}Ge_xO_4$ for broadband near-infrared fiber amplifiers" published in Scientific Reports in 2017 discloses similar glass-ceramic materials in which the $SiO_2$ content of the matrix is 51% by molar fraction.

The article by Z. Fang et al, "$Ni^{2+}$ doped glass ceramic fiber fabricated by melt-in-tube method and successive heat treatment", published in Optics Express in 2015 discloses optical fibers whose core is composed of a glass-ceramic material. It is composed of a silica ($SiO_2$) matrix, the content of which is 64% by molar fraction, and particles of $LiGa_5O_8$. The higher $SiO_2$ content of the matrix makes it possible to increase the transparency of the glass-ceramic and therefore here of the core of the optical fiber (that is to say to decrease propagation losses). However, in the $LiGa_5O_8$ material, of which the particles are made, the gallium ions are arranged in both octahedral and tetrahedral sites. These realizations are similar to those presented in the article by V. N. Sigaev et al, "Nickel-assisted growth and selective doping of spinel-like gallium oxide nanocrystals in germane-silicate glasses for infrared broadband light emission", published in Nanotechnology in 2011, which discloses glass-ceramic materials comprising 35% by molar fraction of $SiO_2$ in the amorphous matrix and crystal particles of $LiGa_5O_8$ and $\gamma$-$Ga_2O_4$. These materials do not have a gallium ion crystal environment composed only of an octahedral site. These materials therefore have a crystal structure that is less favorable to the luminescence of dopants, in particular metal ions.

Current manufacturing methods do not allow the manufacture of glass-ceramics comprising more than 65% by molar fraction of $SiO_2$, which is why, in the prior art, there are no optical elements (such as optical fibers) which make it possible to transmit light radiation at long wavelengths and/or to generate light radiation by luminescence of metal ions that is sufficiently intense to be used.

There is therefore a need for an optical element which is capable of operating for a range of wavelengths not covered by the optical elements of the prior art, for example the luminescence of nickel ions ($Ni^{2+}$) makes it possible to generate optical radiation around 1300 nm with a full width at half maximum of around 300 nm when these ions (in a crystal environment) are excited by optical radiation (such as that from a laser diode emitting at 980 nm).

BRIEF SUMMARY

To this end, what is proposed is an optical element made of a material, the material being a matrix and a set of particles included in the matrix, the material having a molar fraction of $SiO_2$ higher than or equal to 75 percent, preferably between 85 percent and 95 percent, each particle having a dimension smaller than or equal to 80 nanometers, preferably smaller than or equal to 10 nanometers.

According to particular embodiments, the optical element has one or more of the following features, taken in isolation or in any technically feasible combination:
at least one of the following properties is satisfied:
  the material comprises at least 90%, by weight, with respect to the total weight of the material, a composition according to the following formula:

$$(SiO_2)_x(Ga_2O_3)_a(Oxy1)_b(Oxy2)_c$$

where:
  Oxy1 represents an oxide chosen from ZnO, MgO, $NbO_{2.5}$, $WO_3$, NiO, SnO, $TiO_2$, $BiO_{1.5}$, AgO, CaO, MnO, or a mixture thereof, preferably chosen from ZnO, MgO, AgO, $BiO_{1.5}$ or a mixture thereof,
  Oxy2 represents an oxide chosen from $Na_2O$, $K_2O$ or a mixture thereof, Oxy2 preferably represents $Na_2O$,
  x is strictly larger than 60, in particular larger than or equal to 65, and smaller than 99, in particular smaller than 95,
  a is between 1 and 40, preferably between 5 and 25,
  b is between 0 and 35, preferably between 1 and 25,
  c is between 0 and 7, preferably between 0 and 5, and
  x, a, b and c are such that x+a+b+c=100.
each particle is made from $ELGa_2O_4$, where EL denotes an element chosen from Zn, Mg, Nb, W, Ni, Sn, Ti, Bi, Ag, Ca, Mn, or a mixture thereof,
each particle further comprises a doping element,
the doping element is a transition metal, in particular nickel, or a rare earth and
the matrix is made of $SiO_2$.
the material is obtained from a precursor comprising a powder comprising $SiO_2$, $Na_2O$, ZnO and $Ga_2O_3$, the molar fraction of $SiO_2$ in the precursor being between 50 percent and 80 percent, in particular between 65 percent and 75 percent.
the material is obtained from a precursor comprising a powder according to the following formula:

$$(SiO_2)_x(Ga_2O_3)_x(Oxy1)_b(Oxy2)_c$$

where:
  Oxy1 represents an oxide chosen from ZnO, MgO, $NbO_{2.5}$, $WO_3$, NiO, SnO, $TiO_2$, $BiO_{1.5}$, AgO, CaO, MnO, or a mixture thereof, preferably chosen from ZnO, MgO, AgO, $BiO_{1.5}$ or a mixture thereof,
  Oxy2 represents an oxide chosen from $Na_2O$, $K_2O$ or a mixture thereof, Oxy2 preferably represents $Na_2O$,
  x is strictly larger than 50 and smaller than 80,
  a is between 1 and 40, preferably between 5 and 25,
  b is between 0 and 35, preferably between 1 and 25,
  c is between 0 and 7, preferably between 0 and 5, and
  x, a, b and c are such that x+a+b+c=100.
the precursor comprises, in addition to the powder, a doping element, at least one of the following characteristics preferably being satisfied:
  a molar fraction of the doping element in the precursor is between 0.001 percent and 3 percent, and
  the doping element is a transition metal, in particular nickel, or a rare earth.
the material is a glass-ceramic.
at least one of the following properties is satisfied:
  the optical element is a core for an optical fiber, and
  the optical element is configured to transmit optical radiation, in particular broadband optical radiation.
the optical element is an optical fiber comprising a core made of the material and a cladding made of $SiO_2$ surrounding the core.

Also proposed is a method for manufacturing an optical element comprising steps of:
providing a precursor, the precursor comprising a powder comprising $SiO_2$, $Na_2O$, ZnO and $Ga_2O_3$, the molar fraction of $SiO_2$ being between 50 percent and 80 percent, in particular between 65 percent and 75 percent,
inserting the powder into a silica tube running in a main direction to form a preform,
heating and drawing the preform at a temperature higher than or equal to 1700 degrees Celsius to form the optical element, and
annealing the optical element.

According to particular implementations, the method has one or more of the following features, taken in isolation or in any technically feasible combination:
the annealing step comprises the annealing of the optical element at a temperature of between 700 degrees Celsius and 1200 degrees Celsius for a period of time of between 1 second and 10 hours.
the optical element is an optical fiber, the heating step comprising the drawing of the preform in the main direction to form an optical fiber comprising a core and a cladding made of $SiO_2$ surrounding the core.

BRIEF DESCRIPTION OF THE SEVERAL VIEWS OF THE DRAWING(S)

Figure 2:
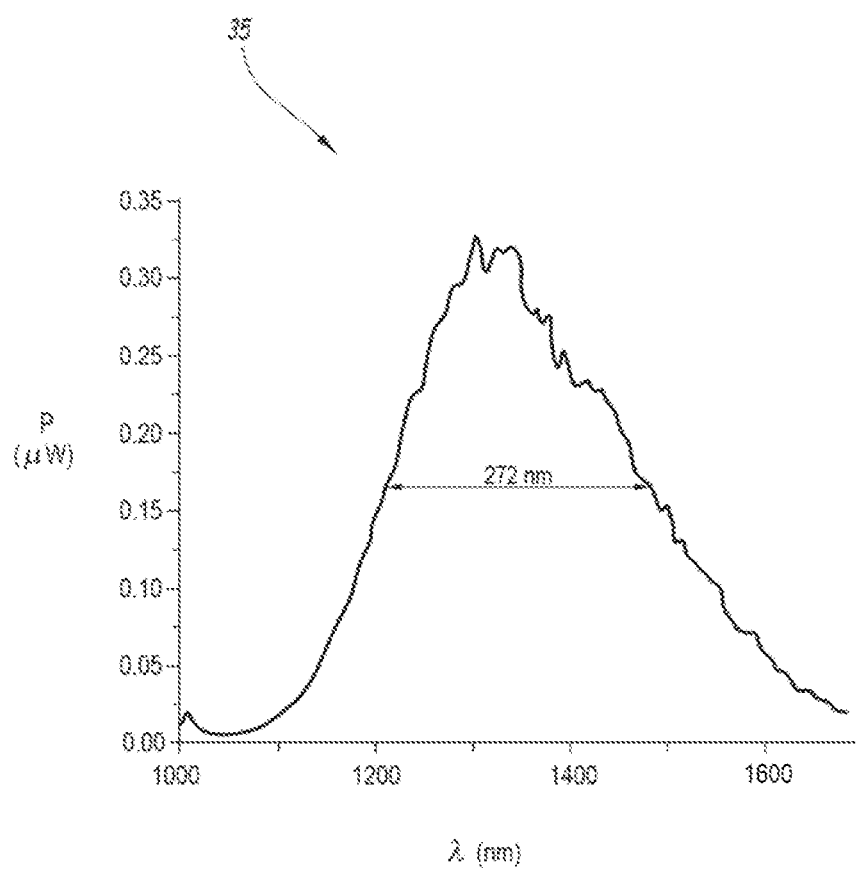
Figure 3:
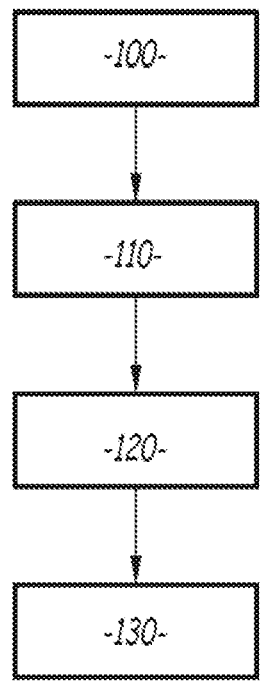
Figure 4:
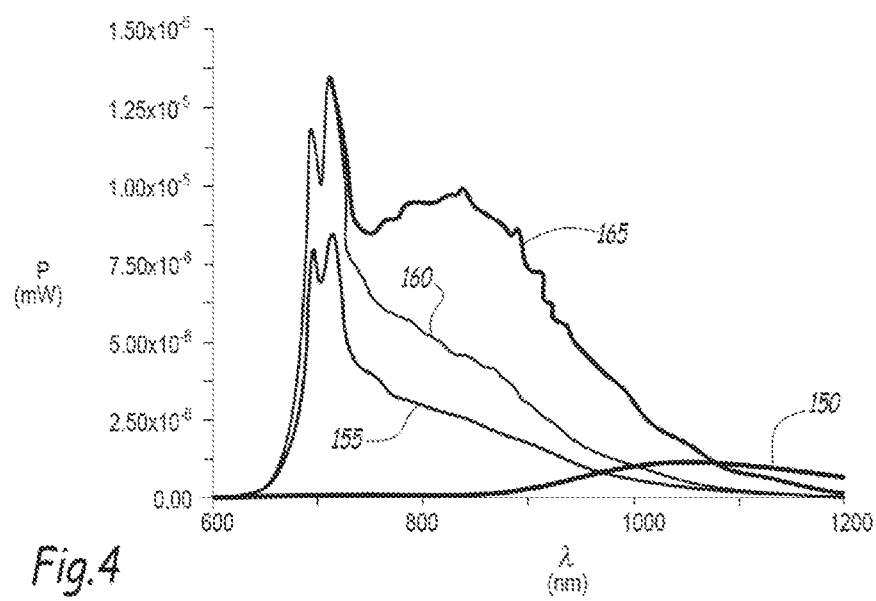
Figure 5:
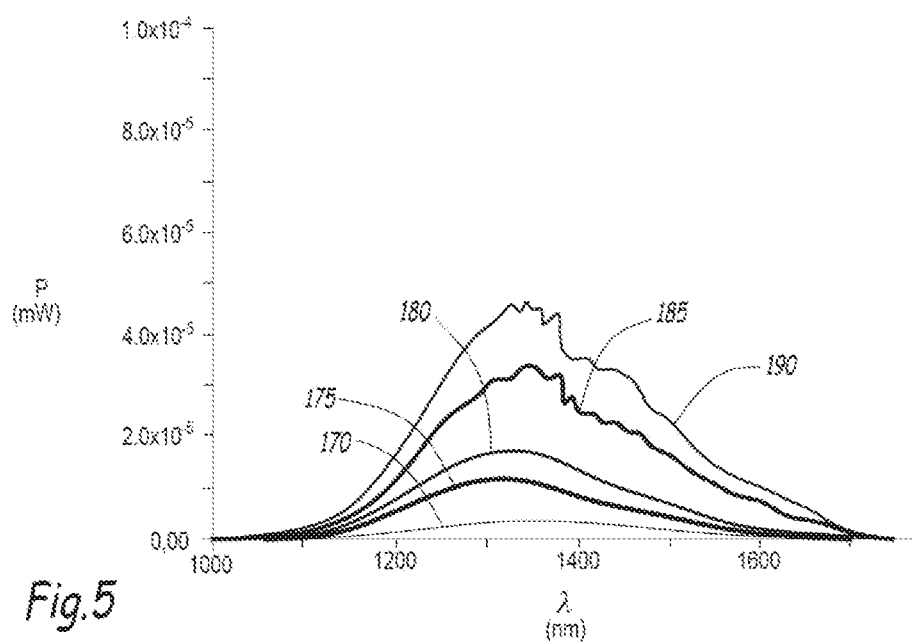

Features and advantages of the invention will become clearly apparent from reading the description which follows, given solely by way of non-limiting example and with reference to the appended drawings, in which:

FIG. 1 schematically shows an exemplary optical element,

FIG. 2 is a graph corresponding to an exemplary optical emission spectrum of the optical element of FIG. 1, FIG. 3 is a flowchart of the steps of an exemplary method for manufacturing the optical element of FIG. 1, FIG. 4 is a graph corresponding to four exemplary optical emission spectra of four exemplary optical elements, and FIG. 5 is a graph corresponding to five exemplary optical emission spectra of five exemplary optical elements.

DETAILED DESCRIPTION

An optical element 10 is shown in FIG. 1.

The term "optical element" is understood to mean an element capable of allowing the propagation of optical radiation inside the element 10.

The optical element 10 is, for example, a core of an optical fiber 15.

An optical fiber is a fiber having two ends and capable of transmitting optical radiation, in particular visible or infrared radiation, between the two ends.

An optical fiber often comprises a core running between the two ends and made of a material transparent to the radiation to be transmitted.

By "transparent", what is understood within the meaning of the present invention is that it is possible to see through the material. This qualitative notion of transparency is specified quantitatively if necessary by means of specular light transmission measurement. The specular transmission measurement protocol consists in measuring the light intensity along the axis of the incident light ray. A material can be considered to be transparent (for optical applications in particular) for a given wavelength when its specular light transmission is higher than or equal to 30% over a few millimeters of propagation.

The core is often surrounded by a protective cladding, for example over the entire length of the optical fiber. In particular, the core is surrounded by the cladding in a plane perpendicular to the direction in which the fiber runs.

The optical fiber 15 comprises, for example, a cladding 20 surrounding the optical element 10.

The cladding 20 is, in particular, provided so that the radiation injected into the core at one end of the optical fiber can escape from the core only at either end. Thus, radiation injected into the core at one end of the optical fiber is conducted by the core to the other end through a judicious choice of the optical index profiles of the core and of the cladding 20.

In the example shown, the optical element 10 takes the shape of a cylinder with a circular base and the cladding 20 is ring-shaped in cross section.

The optical element 10 has two ends. The optical element 10 runs between the two ends. The optical element 10 is, in particular, configured to guide optical radiation between the two ends.

The cladding 20 is, for example, made of silica $SiO_2$.

The optical element 10 has a diameter of, for example, between 1 micron (μm) and 100 μm.

The optical element 10 (core of the fiber) is made of a first material M1.

The first material M1 comprises, for example, at least 90%, such as from 90% to 100%, preferably from 95% to 100%, by weight, with respect to the total weight of the material, of a composition with the following formula:

$$(SiO_2)_x(Ga_2O_3)_a(Oxy1)_b(Oxy2)_c \quad \text{(formula 1)}$$

where:

Oxy1 represents an oxide chosen from ZnO, MgO, $NbO_{2.5}$, $WO_3$, NiO, SnO, $TiO_2$, $BiO_{1.5}$, AgO, CaO, MnO, or a mixture thereof, preferably chosen from ZnO, MgO, AgO, $BiO_{1.5}$ or a mixture thereof, and Oxy2 represents an oxide chosen from $Na_2O$, $K_2O$ or a mixture thereof, Oxy2 preferably represents $Na_2O$, and x is strictly larger than 60, in particular larger than or equal to 65, and smaller than 99, in particular smaller than 95, a is between 1 and 40, preferably between 5 and 25, b is between 0 and 35, preferably between 1 and 25, and c is between 0 and 7, preferably between 0 and 5, and x, a, b and c are expressed as molar percentage and such that x+a+b+c=100.

The molar percentage is equal to the molar fraction multiplied by 100, which makes it possible to express it in %.

The molar fraction of a component in a mixture is equal to the ratio of the amount of material of that component in the mixture (expressed in moles) to the total number of amounts of material of the other components of the mixture (also expressed in moles).

The balance to 100% by weight of the material M1 with respect to the composition of formula 1, that is to say at most 10%, such as 0 to 10%, preferably 0 to 5% by weight, consists of network-forming oxides which lower the melting temperature of silicates and facilitate the vitrification of the material M1 after melting, during fiber drawing. These are mainly $GeO_2$ and $B_2O_3$, two network-forming oxides, the respective contents of which and their total are therefore lower than 10% by weight, preferably lower than 5% by weight.

The first material M1 comprises for example, by molar fraction:

69% $SiO_2$,
4% $Na_2O$,
13% ZnO, and
14% $Ga_2O_3$

According to one variant, the first material M1 comprises, by molar fraction:

93% $SiO_2$,
0% $Na_2O$,
3% ZnO, and
4% $Ga_2O_3$

The first material M1 comprises a matrix 25 and a set of particles 30. For example, the first material M1 consists of a matrix 25 and a set of particles 30.

The term "matrix" is understood to mean a binder ensuring cohesion between the different particles 30. In particular, a mass of material surrounding each particle 30 is an example of a matrix. For example, each particle 30 is included in matrix 25 and is fixed to matrix 25.

The matrix 25 is made of a second material M2. The second material M2 is different from the first material M1.

The second material M2 comprises, for example, $SiO_2$.

According to one embodiment, the first material M1 is a glass-ceramic.

For the purposes of the present invention, the term "glass-ceramic" is understood to mean an inorganic material consisting of a vitreous matrix (amorphous phase) and of crystals, preferably of nanometric size, with a controllable degree of crystallization of between 2% and 70%, that is to say between 2% and 70% by volume of the material is crystalline. Preferably, the degree of crystallization of the glass-ceramic is between 10% and 50%. The crystals are therefore embedded in a glass matrix.

For the purposes of the present invention, the term "glass" is understood to mean an amorphous inorganic solid, exhibiting the phenomenon of glass transition. A glass is obtained by cooling from a liquid phase.

For the purposes of the present invention, the term "nanometric size" is understood to mean a size of between 1 nm and 500 nm, preferably between 5 and 150 nm.

In particular, the matrix 25 is amorphous, and each particle 30 is made of a crystalline material. Each particle 30 is therefore a crystal of nanometric size.

An amorphous material is a material in which there is no order to the atoms on a large scale. It is considered that the scale is large as soon as the material has at least more than 50 atoms.

A crystalline material is a solid whose constituents are assembled together in a regular manner, as opposed to an amorphous material.

A single crystal is an example of a crystalline material. A single crystal or monocrystalline material is a solid material made up of just one crystal.

A polycrystal is another example of a crystalline material. A polycrystal is a solid made up of an assembly of single crystals.

The fact that the particles are in crystalline form makes it possible to create an environment favorable to the luminescence of doping materials such as metal ions, which may be present in the particles (this is detailed in the following paragraphs).

The size of the particles influences the optical propagation losses by scattering and/or diffraction. The larger the particles, the greater the optical losses, which results in a low luminous power at the output of the optical element (therefore at the output of the optical fiber if it is considered that the optical element is an optical fiber core). Thus, it is preferred to have particles of small size, in particular at least smaller than 80 nm, in order to limit these losses.

It is nevertheless important that the particles are still present and of sufficient size in the first material M1, because otherwise any dopants present in the particles exhibit decreasing luminescence.

The first material M1 comprises more than 60 percent (%) $SiO_2$ by molar fraction, which makes it possible to decrease the size of the particles and therefore to decrease optical losses. Silica is a material that is transparent in the desired spectral range (from around 300 nm to around 2500 m), so the more silica and the fewer particles, the better the transmission because losses will be decreased.

According to one embodiment, the molar fraction of $SiO_2$ in the first material M1 is strictly higher than 60%, in particular higher than or equal to 65%. For example, the molar fraction of $SiO_2$ in the first material M1 is higher than or equal to 75%.

The molar fraction of $SiO_2$ in the first material M1 is, for example, between 75% and 99%, in particular between 75% and 95%. In particular, the molar fraction of $SiO_2$ in the first material M1 is between 85% and 99%, in particular between 85% and 95%.

Each particle 30 is included in the matrix 25 of the first material M1.

Each particle 30 has a dimension smaller than or equal to 80 nanometers (nm). By definition, a dimension of the particle 30 is the dimension of the particle 30 measured between two end points of the particle 30 along a direction passing through the center of gravity of particle 30.

In particular, each particle 30 has a maximum dimension smaller than or equal to 80 nanometers. The maximum dimension is the largest of each dimension of the particle 30 in a direction passing through the center of gravity of the particle 30.

According to one embodiment, each particle 30 has a dimension smaller than or equal to 30 nm, and preferably smaller than or equal to 10 nm. In particular, the maximum dimension of each particle 30 is smaller than or equal to 30 nm, and preferably smaller than or equal to 10 nm.

Each particle 30 is made of a third material M3.

The third material M3 is distinct from the first material M1 and from the second material M2.

The third material M3 is, for example, a spinel. The spinels considered here are a group of minerals with the general formula $(X^{2+})(Y^{3+})_2(O^{2-})_4$, where $X^{2+}$ is a divalent cation and $Y^{3+}$ is a trivalent cation.

According to one embodiment, the third material M3 is $ELGa_2O_4$, where EL denotes an element chosen from Zn, Mg, Nb, W, Ni, Sn, Ti, Bi, Ag, Ca, Mn or a mixture thereof, According to one embodiment, the third material M3 is $ZnGa_2O_4$.

According to another embodiment, the third material M3 conforms to the formula $Mg_dZn_{1-d}Ga_2O_4$, in which d represents the molar fraction of MgO in substitution with respect to ZnO in the oxide Oxy1, d being strictly larger than zero.

According to one variant, the third material M3 contains calcium Ca. For example, the third material M3 conforms to the formula $Mg_dCa_eZn_{1-d-e}Ga_2O_4$, where d and e are the respective molar fractions of MgO and of CaO in the oxide Oxy1, at least one molar fraction among d and e being strictly higher than zero. In other words, the oxide Oxy1 comprises a mixture of CaO, MgO and ZnO.

Each particle 30 is, for example, doped. In other words, each particle 30 comprises a doping element.

A doping element is an element present in a small amount in the third material M3 in order to provide or modify certain properties (for example optical properties) of the third material M3. Specifically, the doping element makes it possible to generate light by luminescence if it is preferentially in a crystal environment. This is why the particles are crystalline.

The doping element is, for example, a transition metal.

A transition metal, or transition element, is a chemical element whose atoms have an incomplete d electron subshell, or which can form cations with an incomplete d electron subshell.

Nickel is one example of a transition metal.

Chromium is another example of a transition metal.

It should be noted that other transition metals may be used, such as cobalt, copper, manganese, titanium or vanadium.

It should be noted that doping elements other than transition metals are conceivable. For example, the doping element is a rare earth ion.

The doping of the particles allows light radiation to be generated in a defined spectral range, which depends on the doping element used, when the dopant is excited at a wavelength not within the emission spectral range of the dopant. For example, with nickel as a dopant included in crystal particles, it is possible to obtain radiation around 1300 nm by injecting a laser at 980 nm into the core of the fiber.

The concentration of doping element in the first material M1 is, for example, lower than or equal to 3% by molar fraction. For example, the concentration of doping element in the first material M1 is lower than or equal to 1%. According to one embodiment, the concentration of doping element in the first material M1 is lower than or equal to 0.5%, for example equal to 0.1%.

Embodiments in which the concentration of doping element in the first material M1 is lower than or equal to 0.05%, in particular lower than or equal to 0.001%, are also conceivable, in particular for the transition metals used at very low concentration as doping agents.

It should be noted that, in this description, the molar fraction of a component is calculated without taking into account any potential doping element present in the material. For example, when the second material M2 is $SiO_2$ and the third material M3 is $ZnGa_2O_4$, the molar fraction of $SiO_2$ is equal to the ratio of, as the numerator, an amount of $SiO_2$ material to, as the denominator, the total number of amounts of $SiO_2$ and $ZnGa_2O_4$ material.

The operation of the optical element 10 will now be described.

In a first step, a first optical radiation is injected into the optical element 10. For example, the first optical radiation is injected at one end of the optical element 10.

In a second step, the first optical radiation is guided by the optical element 10 and the cladding 20 from the end where the optical radiation was injected to the other end.

The optical properties of the optical element 10 may be controlled over a wide range of wavelengths if the composition of the first material is modified. In particular, the optical losses by scattering vary according to the amount of $SiO_2$ in the first material M1, in particular according to the size of the particles included in the first material M1, and the same applies for the optical absorption bands in the first material M1.

Optical elements 10 whose third material M3 is doped may emit optical radiation at a well-controlled wavelength that is dependent on the type of dopant.

When the particles 30 have small dimensions with respect to the wavelength of the optical radiation, for example smaller than or equal to 10 nm, the scattering of the optical radiation in the optical element 10 is decreased. In particular, for particles 30 of dimensions smaller than or equal to 10 nm, the optical losses by scattering are limited for radiation having a wavelength longer than or equal to 400 nm. The power available at the output of the optical element 10 is then higher than the power available at the output of the optical elements of the prior art.

Optical elements 10 whose first material M1 has a high $SiO_2$ content, in particular between 85% and 99%, exhibit, for optical radiation propagated through the optical element 10, decreased losses and are particularly easy to integrate into an optical system, for example by welding the optical element 10 to an optical fiber made of silica.

Furthermore, the optical element 10 is easy to manufacture.

The optical element 10 has been described above in the case where the optical element 10 is a core of an optical fiber.

It should be noted that applications other than an optical fiber core 15 are possible for the optical element 10.

For example, the optical element 10 may be used in an emitter of optical radiation, in particular of laser radiation. In this case, the optical element 10 is, in particular, configured to emit optical radiation in the presence of excitation.

The term "laser" is an acronym from the expression "light amplification by stimulated emission of radiation".

In particular, when the optical element 10, in particular the particles present in the material M1 forming the optical element, comprises a doping element, the doping element is capable of emitting the first optical radiation in the presence of excitation.

Examples of emitters of optical radiation are a laser emitter, an optical amplifier or a scintillator.

A laser emitter is a device configured to emit laser radiation using the laser effect.

In the case where the optical element 10 is integrated into a laser emitter, the optical element 10 and the various elements of the laser emitter are, in addition, configured so that the second optical radiation propagating through the optical element 10 is at least partially reflected at each end of the optical element 10. In particular, the optical element 10 thus forms a resonant cavity for the second radiation.

According to one particular embodiment, the emitter of optical radiation is an optical source for an optical coherence tomography imaging system. Optical coherence tomography (or OCT) is a well-established imaging technique that uses a light wave to capture three-dimensional images of a material which scatters light (for example a biological tissue), with a resolution of the order of a micrometer.

The optical elements 10 made of a first material M1 exhibiting, in its particles made of the third material M3, nickel doping exhibit wider optical emissions than the optical elements of the prior art.

This can be seen for example in FIG. 2 which shows an emission spectrum 35 of an optical element 10 acting as the core of an optical fiber 15, that is to say the power P of the emitted radiation as a function of the wavelength λ of the emitted radiation. The power P is expressed in microwatts (μW) and the wavelength λ in nm.

The full width at half maximum of the emission spectrum 35 is in particular equal to 272 nm for an emission centered around a wavelength λ of 1300 nm.

A full width at half maximum (referred to by the common acronym FWHM), is an expression of the amplitude of a function, this function varying a dependent variable according to an independent variable.

The full width at half maximum is, for example, defined by Federal Standard 1037C as being equal to the difference between the two extreme values of the independent variable for which the dependent variable is equal to half of the maximum value of the dependent variable. In other words, the full width at half maximum is the spectral width of the portion of the curve for which the function has an amplitude larger than or equal to half of the maximum amplitude.

In the case of an emission spectrum, the dependent variable is the power P and the independent variable is the wavelength λ of the emitted radiation.

In practice, a full width at half maximum is often estimated from a Gaussian approximation of the function.

A Gaussian approximation consists in estimating a Gaussian function approximating the described set of values, for example via an adjustment of the Gaussian function. In this case, the full width at half maximum is close to the product of the standard deviation of the estimated Gaussian function and 2.355.

When the third material M3 is $Mg_dZn_{1-d}Ga_2O_4$, the spectral width of the emission is particularly large, in particular when the third material M3 exhibits doping such as nickel doping.

In general, the emitter of optical radiation comprising the optical element 10 is often a broadband light source, that is to say a source capable of emitting optical radiation having a full width at half maximum greater than or equal to 100 nm.

Broadband light sources are used in particular to characterize optical components and systems, or to perform optical spectroscopy experiments. In particular, such light sources are particularly suitable for acting as the optical source for an optical coherence tomography imaging system.

An optical amplifier is configured to amplify the first radiation.

In the case where the optical element 10 is integrated into an optical amplifier, the doping element present in the particles is, for example, configured for, when the first radiation is injected into the optical element 10, the doping element to emit optical radiation identical to the first radiation, for example by laser effect.

A scintillator is a device that emits light as a result of absorbing ionizing radiation such as a photon or a charged particle.

The optical element 10 may also be integrated into an X-ray dosimeter or an optical thermometer.

In a dosimeter, the doping elements emit light when they are excited by radiation to be detected such as X-radiation. X-radiation is radiation comprising at least one electromagnetic wave whose wavelength is between 10 picometers and 10 nm.

In a thermometer, the temperature is estimated on the basis of measurements of the excitation lifetime of the doping elements and their emission wavelength.

A dosimeter is a measurement instrument for measuring the radiation dose or the dose equivalent received by a person exposed to ionizing radiation, in particular X-ray.

An optical thermometer is a device configured to measure a temperature of an object on the basis of a measurement of optical radiation emitted by the object, in particular infrared radiation.

In addition, the optical element 10 has been described above as being an element made entirely from the first material M1 and forming part of a device, the device being for example an optical fiber, a light emitter, a dosimeter, a thermometer, or a device comprising an optical fiber.

It should be noted that, simplistically, it is possible to consider the optical element 10 as being the device comprising the element made of the first material M1. In this case, the optical element 10 is, for example, made partially from the first material M1 and partially from another material. In particular, it is possible to consider the optical element 10 as being an optical fiber comprising a core made of the first material M1 and a cladding 20.

According to this approach, an optical cavity comprising two mirrors and a block interposed between the two mirrors, the block being made of the first material M1, is another example of an optical element 10.

An exemplary method for manufacturing the optical element 10 will now be described with reference to FIG. 3.

A flowchart of the exemplary manufacturing method is shown in FIG. 3.

The manufacturing method comprises a provision step 100, an insertion step 110, a heating and drawing step 120 and a thermal annealing step 130.

In the provision step 100, a precursor material MP is provided.

The precursor material MP comprises a powder. For example, the precursor material MP consists of said powder.

This powder has a composition analogous to that of the material M1, with however a value of x for silica $SiO_2$ which may be lower (higher than or equal to 50%) than that of the material M1.

The precursor material therefore comprises the same oxides as those cited for the composition of M1, with a silica content which may be a little lower, the molar percentages of the other oxides (a, b and c) being included in the same ranges as the material M1.

In other words, the precursor material MP conforms to formula 1 above, x being in particular between 50 and 80.

Likewise, $GeO_2$ and $B_2O_3$, the additives added to the composition of formula 1, are also included in the precursor material, with respective concentrations and a total concentration that are lower than 10% by weight, preferably lower than 5% by weight.

The powder comprises in particular the four major oxides of the material M1: $SiO_2$, $Na_2O$, ZnO and $Ga_2O_3$.

A molar fraction of $SiO_2$ in the precursor material MP is between 50% and 80%. In particular, the molar fraction of $SiO_2$ in the precursor material MP is between 65% and 75%.

For example, according to one embodiment, the precursor material MP comprises, or even consists of, by molar fraction:
50% to 80% $SiO_2$,
2% to 7% $Na_2O$,
5% to 25% ZnO, and
5% to 25% $Ga_2O_3$.

According to one particular embodiment, the precursor material MP comprises, or even consists of, by molar fraction:
65% $SiO_2$,
5% $Na_2O$,
13% ZnO, and
17% $Ga_2O_3$.

According to one embodiment, the precursor material MP is doped. In other words, the precursor material MP comprises, in addition to $SiO_2$, $Na_2O$, ZnO and $Ga_2O_3$ (its major oxides), a doping element.

The doping element is, for example, a doping element as described above.

It should be noted that, as already specified, the molar fraction of the various constituents in the materials described in the present application are calculated in the absence of dopants.

The molar fractions of $SiO_2$, $Na_2O$, ZnO and $Ga_2O_3$ in the powder are therefore calculated by considering, as the denominator, the total amount of $SiO_2$, $Na_2O$, ZnO and $Ga_2O_3$ material.

Thus, when the precursor material MP consists, by molar fraction, of:
50% to 80% $SiO_2$,
2% to 7% of $Na_2O$,
5% to 25% of ZnO, and
5 to 25% of $Ga_2O_3$,
it is not excluded that the precursor material MP is doped.

The molar fraction of doping element in the powder is calculated by considering, as the numerator, the amount of doping element material and, as the denominator, the amount of total $SiO_2$, $Na_2O$, ZnO, $Ga_2O_3$ and doping element material.

The molar fraction of the doping element in the precursor material MP is, for example, between 0.001% and 3%.

In the insertion step 110, the powder is inserted into a tube running in a main direction X.

An example of a tube is a tube exhibiting cylindrical symmetry in a plane perpendicular to the main direction X.

The tube is made of $SiO_2$.

The tube and the powder which is contained in the tube form a preform.

In the heating step 120, the preform is heated to a first temperature T1. The first temperature T1 is higher than or equal to 1700 degrees Celsius (° C.).

In the heating and drawing step 120, the first material M1 is obtained from the melting of the various components of the precursor material MP.

For example, chemical diffusion of the constituents of the tube and of the powder takes place. In particular, the molar fraction of $SiO_2$ of the first material M1 is larger than or equal to the molar fraction of $SiO_2$ of the precursor material MP.

Specifically, the silica $SiO_2$ contained in the tube diffuses into the optical element, for example into the core of the fiber if the element is a fiber core. It is this diffusion effect which makes it possible to significantly increase the amount of silica and thus to obtain a first material M1 comprising more silica than the precursor material (powder). This is impossible to achieve with conventional methods based on the use of furnaces.

In particular, when the optical element 10 is a core of an optical fiber 15, the preform is drawn in the main direction X to form the optical fiber 15 in the heating step 120.

The tube then forms the cladding 20 of the optical fiber 15.

At the end of the heating and drawing step 120, the optical element 10 is then placed in an annealing furnace. During the transfer of the optical element 10 from one furnace to another, the optical element 10 is cooled. In particular, the optical element 10 is hardened by contact with air.

It should be noted that examples of a manufacturing method in which the heating step 120 and the annealing step 130 are implemented without movement or with very slight movement of the optical element 10 may be used, in particular if the heating and annealing furnaces are the same or very close to one another.

Steps 100 to 120 form a "powder-in-tube" type method.

In the annealing step 130, the optical element 10 is heated to a second temperature T2 for a predefined period of time ΔT. In practice, the cladding 20 is also heated to the same second temperature T2 as the optical element 10 and for the same period of time ΔT.

According to one embodiment, the period of time ΔT is longer than or equal to 1 second, in particular longer than or equal to 1 minute.

According to one embodiment, the period of time ΔT is longer than or equal to 1 hour (h). For example, the period of time ΔT is longer than or equal to 10 h.

The second temperature T2 is, for example, between 700° C. and 1200° C.

A crystallization temperature is defined for the third material M3.

The second temperature T2 is higher than or equal to the crystallization temperature.

However, in practice, the difference between the second temperature T2 and the crystallization temperature is controlled.

For example, a difference between the second temperature T2 and the crystallization temperature is smaller than or equal to 200° C.

In particular, the difference between the second temperature T2 and the crystallization temperature is smaller than or equal to 100° C. According to one embodiment, the difference between the second temperature and the crystallization temperature is smaller than or equal to 75° C.

The second temperature T2 is, for example, between 750° C. and 800° C. According to one embodiment, the second temperature T2 is between 770° C. and 780° C., for example equal to 775° C.

In particular, the second temperature T2 is between 750° C. and 850° C. when the period of time ΔT is longer than or equal to 5 h.

It should be noted that other second temperatures may be considered.

After the annealing step 130, the optical element 10 is then integrated into an optical system. For example, when the optical element 10 is a core of an optical fiber 15, the optical fiber 15 is welded to another optical fiber.

The manufacturing method makes it possible to obtain a first material M1 having an $SiO_2$ content that is higher than the manufacturing methods of the prior art, in particular higher than or equal to 65%.

The manufacturing method also makes it possible to easily modify the characteristics of the obtained optical element 10. In particular, the number and dimensions of the particles 30 may vary according to the parameters of the annealing step 130.

An annealing step 130 at a second temperature of between 750° C. and 800° C. for a period longer than or equal to 5 h makes it possible to obtain particles 30 of small size and therefore low losses by optical scattering.

The manufacture of the optical element 10 results in the incorporation of the doping element into the particles 30. The amount of doping element in the particles 30 may therefore be much higher than the amount of doping element in the optical fibers made of $SiO_2$. In general, the first material M1 may exhibit a molar fraction of dopants that is higher than the optical fibers made of $SiO_2$.

An optical element 10 made from a precursor material MP consisting, by molar fraction, of:
50% to 80% $SiO_2$,
2% to 7% $Na_2O$,
5% to 25% ZnO, and
5 to 25% $Ga_2O_3$
exhibits low optical losses.

Among these optical elements 10, an optical element 10 whose precursor material MP comprises, by molar fraction:
65% $SiO_2$,
5% $Na_2O$,
13% ZnO, and
17% $Ga_2O_3$
exhibits particularly low optical losses.

In certain applications, it is conceivable for the optical element 10 to be manufactured by means of the manufacturing method detailed above, with the cladding 20 being removed between the heating step 120 and the annealing step 130, or after the annealing step 130.

It is also conceivable for cladding 20 to be added to the optical element 10 after the annealing step 130, for example when the cladding 20 is cladding made of a polymer material.

It should be noted that other compositions of the precursor material MP may be considered.

The annealing step 130 above has been described in detail in the case of annealing at low temperature for several hours. However, anneals at a second, higher temperature T2, in particular between 975° C. and 1025° C., for a period of time ΔT shorter than or equal to 10 minutes, in particular shorter than or equal to 5 minutes, are also possible.

Such anneals at high temperature for a short period of time also make it possible to obtain particles P with small dimensions and therefore lower scattering losses.

The effects of the anneal are shown in the case where the optical element 10 is an optical fiber core by four spectra 150, 155, 160 and 165 in FIG. 4.

In particular, the first material M1 of each of the optical elements 10 corresponding to the four spectra 150 to 165 exhibits doping with chromium $Cr^{3+}$. The amount of chromium in the first material M1 is in particular equal to 0.1%.

The spectrum 150 corresponds to an optical element 10 which has not undergone an annealing step 130, the spectrum 155 corresponds to an optical element 10 annealed for 30 minutes at 900° C., the spectrum 160 corresponds to an optical element 10 annealed for 40 minutes at 850° C. and the spectrum 165 corresponds to an optical element 10 annealed for 40 minutes at 800° C.

The effects of the anneal are shown in the case where the optical element 10 is an optical fiber core by five spectra 170, 175, 180, 185 and 190 in FIG. 5.

In particular, the first material of each of these optical elements 10 corresponding to the five spectra 170 to 190 exhibits doping with nickel $Ni^{2+}$. The amount of nickel in the first material M1 is in particular equal to 0.5%.

The spectrum 170 corresponds to an optical element 10 annealed 130 for 10 minutes at 1000° C., the spectrum 175 corresponds to an optical element 10 annealed for 25 minutes at 900° C., the spectrum 180 corresponds to an optical element 10 annealed for 4 hours at 850° C., the spectrum 185 corresponds to an optical element 10 annealed for 6 hours at 820° C., and the spectrum 190 corresponds to an optical element 10 annealed for 7 hours at 800° C.

The invention claimed is:

1. An optical element made of a first material (M1), the first material (M1) comprising a matrix made of a second material (M2) and a set of particles, the set of particles being made of a third material (M3) and included in the matrix, wherein the first material (M1) has a molar fraction of $SiO_2$ higher than or equal to 75 percent, each particle has a dimension smaller than or equal to 80 nanometers, the first material (M1) is obtained from a precursor comprising a powder comprising $SiO_2$, $Na_2O$, ZnO and $Ga_2O_3$, and the first material (M1) comprises at least 90%, by weight, with respect to the total weight of the first material, a composition according to the following formula:

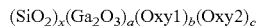

where:
- Oxy1 represents an oxide chosen from ZnO, MgO, $NbO_{2.5}$, $WO_3$, NiO, SnO, $TiO_2$, $BiO_{1.5}$, AgO, CaO, MnO, or a mixture thereof,
- Oxy2 represents an oxide chosen from $Na_2O$, $K_2O$, or a mixture thereof,
- x is larger than 75 and smaller than 94,
- a is between 5 and 25,
- b is between 1 and 25,
- c is between 0 and 5, and
- x, a, b and c are such that x+a+b+c=100.

2. The optical element as claimed in claim 1, wherein the third material (M3) is $ELGa_2O_4$, where EL denotes an element chosen from Zn, Mg, Nb, W, Ni, Sn, Ti, Bi, Ag, Ca, Mn, or a mixture thereof.

3. The optical element as claimed in claim 1, wherein the third material (M3) comprises a doping element.

4. The optical element as claimed in claim 3, wherein the doping element is a transition metal, or a rare earth element.

5. The optical element as claimed in claim 1, wherein the second material (M2) comprises $SiO_2$.

6. The optical element as claimed in claim 1, wherein the molar fraction of $SiO_2$ in the M1 precursor is between 50 percent and 80 percent.

7. The optical element as claimed in claim 1, wherein the first material (M1) is obtained from a precursor comprising a powder according to the following formula:

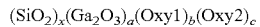

where:
- Oxy1 represents an oxide chosen from ZnO, MgO, $NbO_{2.5}$, $WO_3$, NiO, SnO, $TiO_2$, $BiO_{1.5}$, AgO, CaO, MnO, or a mixture thereof,
- Oxy2 represents an oxide chosen from $Na_2O$, $K_2O$, or a mixture thereof,
- x is strictly larger than 50 and smaller than 80,
- a is between 5 and 25,
- b is between 1 and 25,
- c is between 0 and 5, and
- x, a, b and c are such that x+a+b+c=100.

8. The optical element as claimed in claim 6, wherein the precursor comprises, in addition to the powder, a doping element, and wherein:
- a molar fraction of the doping element in the precursor is between 0.001 percent and 3 percent, and
- the doping element is a transition metal, or a rare earth element.

9. The optical element as claimed in claim 1, wherein the first material (M1) is a glass-ceramic.

10. The optical element as claimed in claim 1, wherein at least one of the following properties is satisfied:
- the optical element is a core for an optical fiber, and
- the optical element is configured to emit optical radiation.

11. The optical element as claimed in claim 1, wherein the optical element is an optical fiber comprising a core made of the first material (M1) and a cladding made of $SiO_2$ surrounding the core.

12. A method for manufacturing the optical element as claimed in claim 1, the method comprising:
- providing a precursor, the precursor comprising a powder comprising $SiO_2$, $Na_2O$, ZnO and $Ga_2O_3$, the molar fraction of $SiO_2$ being between 50 percent and 80 percent,
- inserting the powder into a silica tube running in a main direction (X) to form a preform,
- heating and drawing the preform at a temperature higher than or equal to 1700 degrees Celsius to form the optical element, and
- annealing the optical element.

13. The method for manufacturing an optical element as claimed in claim 12, wherein the annealing step comprises the annealing of the optical element at a temperature of between 700 degrees Celsius and 1200 degrees Celsius for a period of time of between 1 second and 10 hours.

14. The method for manufacturing an optical element as claimed in claim 12, wherein the optical element is an optical fiber, the heating step comprising the drawing of the preform in the main direction (X) to form an optical fiber comprising a core and a cladding made of $SiO_2$ surrounding the core.

* * * * *